J. A. MARTIN & F. M. MACY.
METAL AUTOMOBILE TIRE.
APPLICATION FILED JUNE 28, 1915.

1,195,490.

Patented Aug. 22, 1916.

Inventors
Joseph A. Martin
Frank M. Macy

UNITED STATES PATENT OFFICE.

JOSEPH A. MARTIN AND FRANK M. MACY, OF MIDAS, NEVADA.

METAL AUTOMOBILE-TIRE.

1,195,490.

Specification of Letters Patent.   Patented Aug. 22, 1916.

Application filed June 28, 1915.   Serial No. 36,855.

*To all whom it may concern:*

Be it known that we, JOSEPH A. MARTIN and FRANK M. MACY, citizens of the United States, residing at Midas, in the county of Elko, State of Nevada, have invented a new and useful Metal Automobile-Tire, of which the following is a specification.

This invention relates to resilient vehicle wheel tires and has as its object to provide a tire which will possess substantially the same resiliency as the pneumatic tire and yet will not present the disadvantages attending the use of a pneumatic tire such, for example, as punctures, blow-outs, etc.

It is one aim of the invention to so construct the tire that the same may be readily repaired whenever required and so that the tire will be yieldable at all points in its circumference and so that any portion thereof may yield without the remainder being affected.

Another aim of the invention is to so construct the tire that the sections thereof may be readily assembled and when assembled will not be liable to become disarranged even when subjected to violent impacts.

Figure 1:
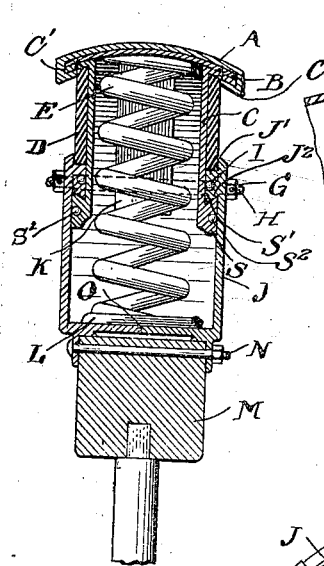
Figure 2:
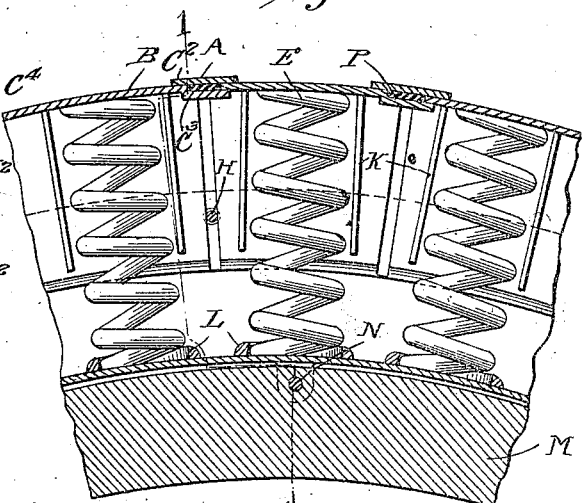
Figure 3:
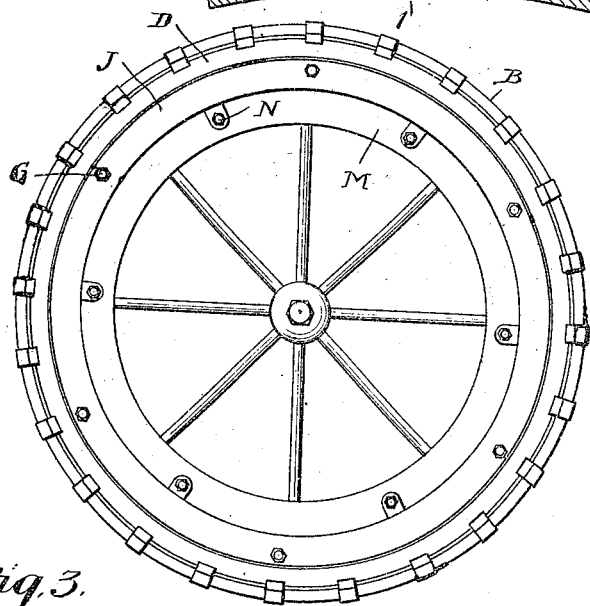

In the accompanying drawings: Figure 1 is a vertical transverse sectional view on the line 1—1 of Fig. 2 through the tire embodying the present invention. Fig. 2 is a fragmentary circumferential sectional view through the tire. Fig. 3 is a side elevation of a wheel equipped with the tire.

In the drawings the letter M indicates the fixed rim or felly of the wheel to which the tire is applied. The tire includes an annular channel member which is disposed to surround the said fixed rim or felly and which comprises two annular sections J having inwardly extending flanges which are designed to surround the outer surface of the felly in the manner clearly shown in Fig. 1 of the drawings, and which are in turn provided with flanges which embrace the sides of the said felly and through which are secured bolts N, these bolts serving to secure the sections J in assembled relation and rigid upon the said felly. The body portions of the sections J occupy parallel planes and the channel in cross section is substantially U-shaped. For a purpose to be presently explained the opposite side walls of the channel member are formed upon their opposing faces and adjacent their outer edges each with an annular rib J', the inner side of which is beveled as indicated at J² and also for a purpose to be presently explained, each rib is provided in its face which is presented toward the middle of the channel member, with a groove receiving bearing balls or rollers I.

In addition to the channel member above described the tire comprises an outer or tread portion which is made up of a number of assembled sections capable of substantially independent movement radially inwardly against the tension of cushioning springs, as will be presently more specifically pointed out. Each of the said sections comprises a tread plate B which is transversely curved as shown in Fig. 1, in addition to being curved from end to end to conform to the circumferential curvature of the tire as a whole and assembled with each of the plates B are side plates C provided at their outer edges with outwardly extending inwardly inclined flanges C' which are riveted or otherwise secured to the lateral marginal portion of the respective plate B. Riveted or otherwise secured as at C² to the outer face of each plate B adjacent one end thereof, is a transverse band A and adjacent the point of location of the securing means C² each plate B has its end portion offset inwardly as indicated at C³ so as to lie in spaced relation to the band A and by reference to Fig. 2 of the drawings it will be observed that the other end of each of the plates B is slidably received within the socket thus formed between the said offset portion C³ and band A of the next adjacent one of the plates B so that when the sections B move inwardly radially under the force of impact the sections may move slidably with relation to each other to permit of such yielding movement thereof. By reference to Fig. 1, it will be observed that the ends of the band A are bent downwardly and inwardly as at C⁴ about the edges of the flanges C' and the edges of the respective plate B. In order that the relative sliding movement of the sections B may be cushioned, rubber strips P are arranged within the pockets formed between the offsets C³ and bands A and are adapted to be compressed by the initial movement of the end edges of the plates B which fit slidably within these pockets.

In order to exclude dust and dirt from the interior of the tire, rubber filling sheets D are disposed against the outer faces of the side plates C and rest at their outer edges beneath the flanges C' and at their inner edges within the outer edge portions of the sections J and against the outwardly presented edges of the rib J'. As will be observed by reference to Figs. 1 and 2 of the drawings, the inner marginal portions of the side plates C are received within the channel member or, in other words, inwardly of the side portions of the sections J. Each is provided with an arcuate rib S having a beveled outer edge portion S' and provided in its outer face with a groove receiving bearing balls or rollers $S^2$. The cushioning springs which will be presently described normally force the tread sections in an outward direction and so that the beveled edges of their ribs S will rest against the beveled inner edges of the ribs J' by reason of which engagement the outward movement of the tread sections is retarded. It will also be observed by reference to Fig. 1 that the anti-friction bearing elements I coöperate with the side plates C of the tread sections and that the anti-friction bearing elements $S^2$ coöperate with the side portions of the sections J so that the radial movement of the tread sections with relation to the channel member is attended with minimum frictional engagement between these parts.

The cushioning springs above referred to are indicated by the reference letter E and at their outer ends bear against the tread plate B and at their inner ends seat within an annular boss L formed upon the inner wall of the channel member. The outer portions of the springs are prevented from displacement with relation to the tread members by means of integral guide plates K which project inwardly radially from the tread plates B. Bolts H are secured through the sides of the sections J at suitable intervals and extend between the adjacent edges of the side plates C of the adjacent tread members.

Having thus described the invention, what is claimed as new is:

1. In a vehicle wheel tire of the class described, a relatively fixed channel member, tread members arranged in a series surrounding the channel member and each comprising a tread portion having an inwardly offset end, a band secured transversely to the said end of each tread member and extending in spaced relation to the said offset end, whereby to form a socket slidably receiving the adjacent end of the next adjacent tread member, and means housed within the said channel member and the said tread members and yieldably holding the tread members in an outward direction.

2. In a vehicle wheel tire of the class described, a relatively fixed channel member, tread members arranged in a series surrounding the channel member and each comprising a tread portion having an inwardly offset end, a band secured transversely to the said end of each tread member and extending in spaced relation to the said offset end, whereby to form a socket slidably receiving the adjacent end of the next adjacent tread member, means housed within the said channel member and the said tread members and yieldably holding the tread members in an outward direction, and a yieldable filling within each of said sockets.

3. In a vehicle wheel tire of the class described, a relatively fixed channel member provided upon the inner face of each side wall with an annular rib, tread members arranged in a series surrounding the channel member and having each a tread portion and spaced side portions, the side portions fitting slidably between the side walls of the channel member and being each provided with a rib arranged to coöperate with the rib upon the respective side wall of the channel member whereby to limit the outward movement of the tread members, a sheet of yieldable material disposed against the outer face of each side portion of each tread member and between the tread portion of the said tread member and the rib upon the corresponding side wall of the channel member, and means housed within the channel member and the said tread members yieldably holding the members in an outward direction.

JOSEPH A. MARTIN.
FRANK M. MACY.

Witnesses:
  John W. Cody,
  Mrs. Arthur A. Primeaux.